(12) United States Patent
Jones et al.

(10) Patent No.: US 12,303,809 B2
(45) Date of Patent: May 20, 2025

(54) SUBSEA FILTER

(71) Applicant: Blakemere Engineering Pty Ltd, Welshpool (AU)

(72) Inventors: Linden Trevor Jones, Welshpool (AU); Jakub Kawka, Welshpool (AU)

(73) Assignee: Blakemere Engineering Pty Ltd, Welshpool (AU)

( * ) Notice: Subject to any disclaimer, the term of this patent is extended or adjusted under 35 U.S.C. 154(b) by 466 days.

(21) Appl. No.: 17/793,127

(22) PCT Filed: Jun. 22, 2020

(86) PCT No.: PCT/AU2020/050631
§ 371 (c)(1),
(2) Date: Jul. 15, 2022

(87) PCT Pub. No.: WO2021/142507
PCT Pub. Date: Jul. 22, 2021

(65) Prior Publication Data
US 2023/0338878 A1 Oct. 26, 2023

(30) Foreign Application Priority Data

Jan. 17, 2020 (AU) ............................. 2020900137
Feb. 14, 2020 (AU) ............................. 2020900424

(51) Int. Cl.
*E21B 41/00* (2006.01)
*B01D 29/05* (2006.01)
*B01D 29/54* (2006.01)

(52) U.S. Cl.
CPC ........... *B01D 29/54* (2013.01); *B01D 29/055* (2013.01)

(58) Field of Classification Search
CPC .... E21B 41/0007; B01D 29/055; B01D 29/54
See application file for complete search history.

(56) References Cited

U.S. PATENT DOCUMENTS

| 4,878,783 | A | * | 11/1989 | Baugh | ..................... E21B 41/04 166/344 |
| 5,738,172 | A | * | 4/1998 | van Mook | .............. E21B 34/10 166/344 |
| 6,009,950 | A | * | 1/2000 | Cunningham | ........ E21B 33/038 166/347 |

(Continued)

FOREIGN PATENT DOCUMENTS

| WO | WO2012/163784 A1 | 12/2012 |
| WO | WO2015/123736 A1 | 8/2015 |

OTHER PUBLICATIONS

International Search Report from corresponding International Patent Application No. PCT/AU2020/050631, dated Aug. 17, 2020.

*Primary Examiner* — Matthew R Buck
(74) *Attorney, Agent, or Firm* — Renner, Otto, Boisselle & Sklar, LLP

(57) ABSTRACT

A replaceable subsea filter uses a hot-stab style connection. The filter has a flow path located along a central axis. At a distal end of the of the filter, the flow path locates inside a subsea receptable, typically associated with a reservoir or sea chest for a hydraulic actuator. At a proximal end, the flow path opens into an annulus around the stab-connecter, the annulus being separated from the surrounding waters by annular filters.

18 Claims, 4 Drawing Sheets

(56) References Cited

U.S. PATENT DOCUMENTS

| | | | |
|---|---|---|---|
| 6,840,088 B2* | 1/2005 | Tucker | F16L 1/26 |
| | | | 73/49.5 |
| 2009/0217992 A1* | 9/2009 | Wilson | E21B 43/20 |
| | | | 210/416.1 |

* cited by examiner

SUBSEA FILTER

FIELD OF THE INVENTION

The present invention relates to filters for use in subsea applications.

BACKGROUND TO THE INVENTION

Many remotely operated actuators in subsea equipment, particularly valves, are hydraulically actuated, and have an internal volume which changes as the actuator functions. This means that function of the actuator will generally result in displacement of hydraulic fluid. The displaced hydraulic fluid is typically transposed with seawater within a sea chest or reservoir via a separating membrane. The reservoir and membrane may be within a hydraulic accumulator or similar device.

In a subsea environment, the reservoir is usually vented to the surrounding seawater in order to reference the ambient pressure.

A filter is located between the reservoir or sea chest and the surrounding seawater to prevent ingress of sand, marine growth, and other matter into the actuator.

Such filters are prone to blockage over time, whether by sand, sediment, organic matter or the effects of cathodic protection systems. Blockage of the filter leads to inefficiency and ultimately inoperability of the subsea equipment.

Replacement of a blocked filter generally requires the entire subsea structure to be recovered to the surface.

The present invention seeks to provide a filter which can be replaced as necessary by a diver or by use of a Remotely Operated Vehicle (ROV), without requiring the recovery to the surface of significant subsea assets.

SUMMARY OF THE INVENTION

According to one aspect of the present invention there is provided a subsea filter having an elongate connecting plug extending along an operating axis; and at least one filtration screen;
  the elongate connecting plug having a fluid flow path defined between a first flow port and a second flow port, the first flow port and the second flow port being axially spaced along the elongate plug; and
  the filtration screen being located outside the second flow port in order to filter seawater entering the fluid flow path by the second flow port.

It is preferred that the subsea filter has at least one opening through which seawater can pass, the filtration screen being located between the at least one opening and the second flow port.

It is preferred that the connecting plug is a hot-stab style plug.

It is preferred that the filtration screen extends away from the elongate connecting plug, most preferably in a generally radial direction.

The filtration screen may be perpendicular to the operating axis. It is preferred that the filtration screen is annular, and centred about the operating axis. The opening of the subsea filter may also be annular.

It is preferred that the subsea filter includes two annular openings, each of which has an associated filtration screen, the annular openings being axially spaced from each other.

It is preferred that the subsea filter includes an outer cylindrical casing around the filtration screens; the outer cylindrical casing combining with the screens and a portion of the elongate connecting plug to form an annular cylinder, the second flow port being located on the portion of the elongate connecting plug.

The first flow port may be axially spaced from the second flow port. It is preferred that the first flow port is located distally of the second flow port.

The first flow port is preferably oriented in a radial direction. The second flow port is also preferably oriented in a radial direction.

The fluid flow path preferably includes an axial portion.

It will be appreciated that the fluid flow path may include a plurality of first flow ports and/or second flow ports.

The elongate connecting plug may have a plurality of fluid flow paths, the fluid flow paths having respective axial portions which are parallel to each other. It is expected that each fluid flow path will have a corresponding first flow port and second flow port. The respective first flow ports may be axially spaced along the elongate connecting plug. In this aspect of the invention each second flow port is separated from an opening of the subsea filter by at least one filtration screen. The respective second flow ports may be circumferentially spaced around the elongate connecting plug.

In a preferred embodiment, the connecting plug includes circumferential resilient seals on both axial sides of each first flow port.

According to a second aspect of the present invention there is provided a subsea filter having an elongate connecting plug extending along an operating axis; and at least one filtration screen extending away from the elongate connecting plug;
  the elongate connecting plug having a fluid flow path defined between a first flow port oriented towards a distal end of the elongate connecting plug and a second flow port oriented towards a proximal end of the elongate connecting plug;
  the subsea filter having at least one opening through which seawater can pass; and
  the filtration screen being located between the at least one opening and the second flow port.

According to a third aspect of the present invention there is provided a receptacle for a subsea filter, the receptacle including an elongate connecting plug receiving portion, the receptacle having at least one fluid flow port opening into the connecting plug receiving portion, the fluid flow port being in fluid communication with a reservoir of a subsea hydraulic actuator.

Preferably the fluid flow port is oriented in a radial direction relative to the connecting plug receiving portion.

Preferably the connecting plug receiving portion is a hot-stab type receptacle.

BRIEF DESCRIPTION OF THE DRAWINGS

It will be convenient to further describe the invention with reference to preferred embodiments of the present invention. Other embodiments are possible, and consequently the particularity of the following discussion is not to be understood as superseding the generality of the preceding description of the invention. In the drawings.

DETAILED DESCRIPTION OF PREFERRED EMBODIMENTS

Figure 1:
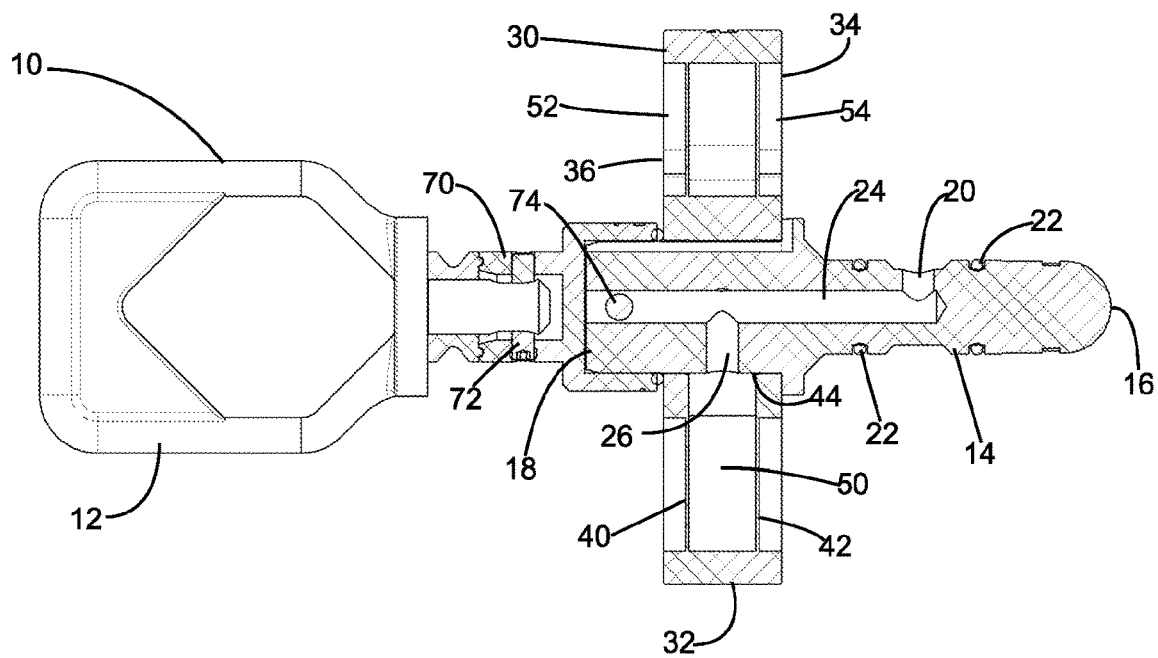
FIG. 1 is a cross section through a subsea filter in accordance with the present invention.
Figure 2:
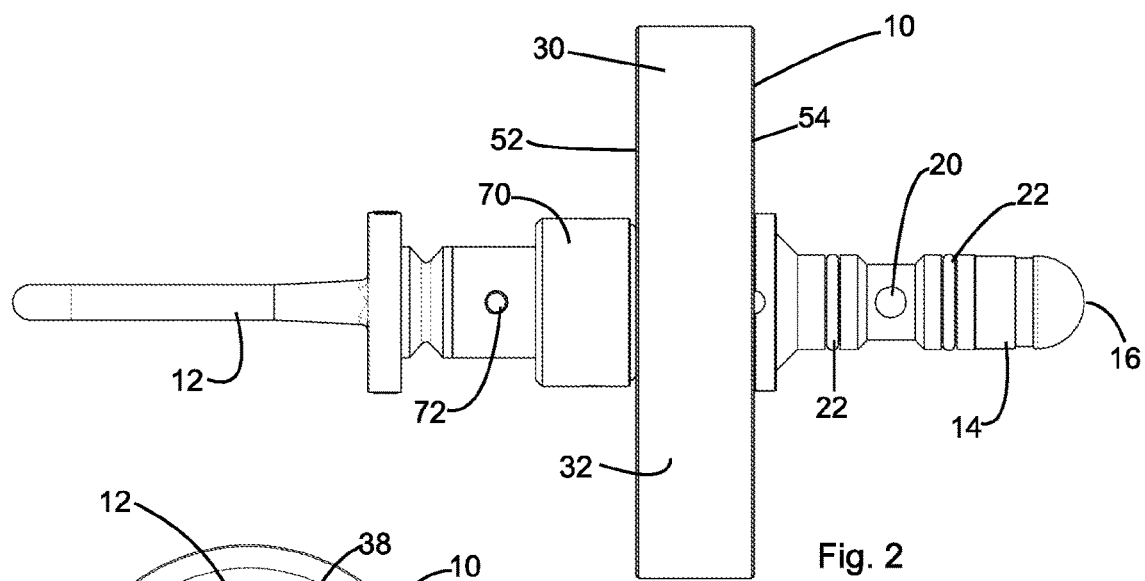
FIG. 2 is a side view of the subsea filter of FIG. 1.
Figure 3:
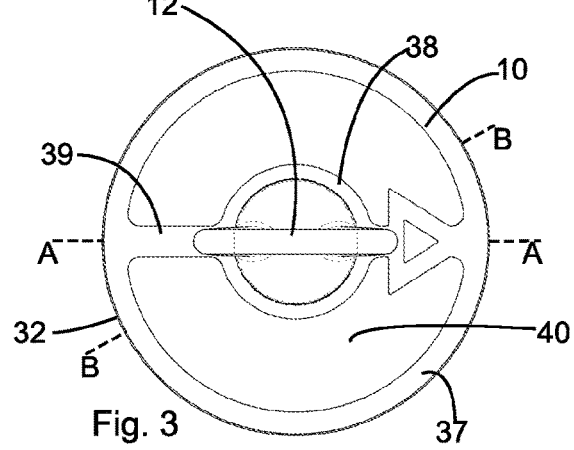
FIG. 3 is a plan view of the subsea filter of FIG. 1.

Referring to the Figures, a subsea filter 10 is arranged along a longitudinal axis. The filter 10 includes an operating handle 12 arranged to be manipulated by an ROV, and a hot-stab connecting plug 14 arranged to locate within a complementary connecting plug receiving portion 102 within a receptacle 100 connected to a reservoir or sea chest of a subsea hydraulic actuator. The operating handle 12 is pinned to an adaptor 70 by means of a first pin 72. The adaptor 70 is pinned to the connecting plug 14 by means of a second pin 74.

The connecting plug 14 has a distal end 16 and a proximal end 18. A first flow port 20 is located towards the distal end 16, opening in a radial direction. Two O-ring seals 22 are axially spaced, one on either side of the first flow port 20, to ensure a sealed connection within the connecting plug receiving portion 102.

An axial bore 24 extends through the connecting plug 14 from the proximal end 18 to a location corresponding to the first flow port 20. The axial bore 24 is fluidly connected to the first flow port 20.

A second flow port 26 is located towards the proximal end 18. The second flow port 26 opens in a radial direction, and is fluidly connected to the axial bore 24.

A filtering unit 30 extends in a radial direction from the proximal end 18 of the connecting plug 14. The filtering unit 30 is generally annular cylindrical, with an outer diameter in the order of five times that of the connecting plug 14, and a height in the order of one fourth that of the connecting plug 14.

The filtering unit 30 is formed by a frame having a cylindrical outer wall 32, a distally facing axial surface 34 and a proximally facing axial surface 36. The distally facing axial surface 34 and the proximally facing axial surface 36 each have an outer annular lip 37 on an inner rim of the cylindrical outer wall 32, an inner annular lip 38 extending around the connecting plug 14, and a diametrically extending bar 39 connecting the outer annular lip 37 to the inner annular lip 38.

A first filtration screen 40 is located immediately inside the proximally facing axial surface 36. The first filtration screen 40 is annular, extending between the inner annular lip 38 and the outer annular lip 37. In the embodiment of the drawings the first filtration screen 40 is a 1.0 mm aperture mesh, although the size of mesh may be chosen for particular applications.

A second filtration screen 42 is located immediately inside the distally facing axial surface 34. The second filtration screen 42 is annular, extending between the inner annular lip 38 and the outer annular lip 37. In the embodiment of the drawings the second filtration screen 42 is a 1.0 mm aperture mesh.

In a preferred embodiment of the invention the filtration screens 40, 42 are made from a copper-nickel alloy which is corrosion resistant and which has natural biocide characteristics to slow the propensity for marine growth.

It will be appreciated that an annular cylindrical chamber 50 is formed by a combination of the first filtration screen 40, the cylindrical outer wall 32, the second filtration screen 42, and a portion 44 of the connecting plug 14 between the respective inner annular lips 38. The second flow port 26 is located axially within the portion 44 of the connecting plug 14; that is, is arranged to open into the annular cylindrical chamber 50.

The annular cylindrical chamber 50 has a first opening 52 defined by the spaces between the inner annular lip 38 and outer annular lip 37 alongside the first filtration screen 40 and a second opening 54 defined by the spaces between the inner annular lip 38 and outer annular lip 37 alongside the second filtration screen 42.

The receptacle 100 of the reservoir or sea chest has a radially aligned fluid port 104 which opens into the connecting plug receiving portion 102.

Figure 4:
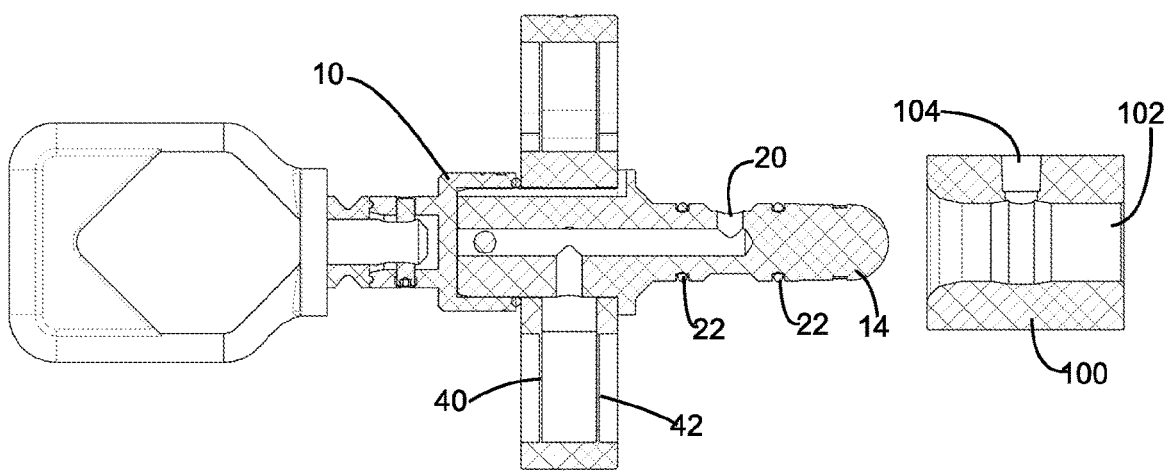
FIG. 4 is a cross section through line A-A of the subsea filter of FIG. 3 shown during installation.
Figure 5:
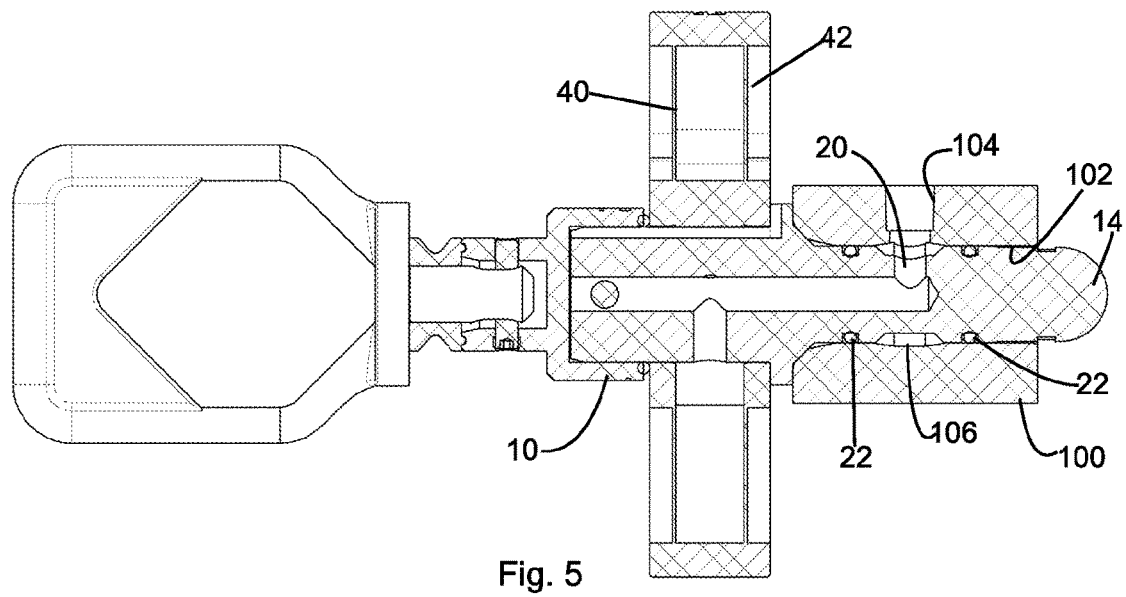
FIG. 5 is a cross section through the subsea filter of FIG. 1 shown once installed.
Figure 6:
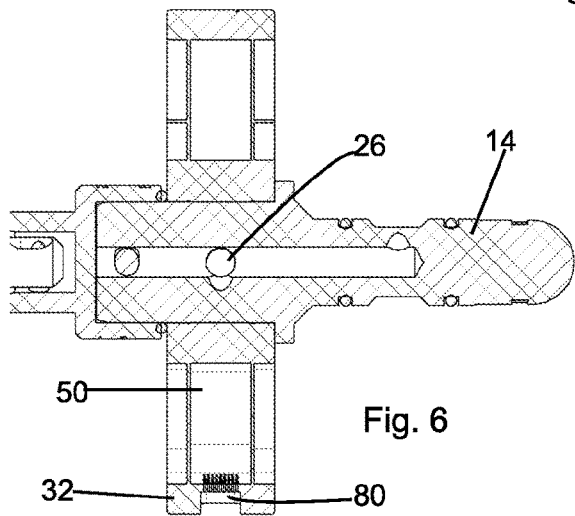
FIG. 6 is a portion of a cross section through line B-B of the subsea filter of FIG. 3.
Figure 6A:
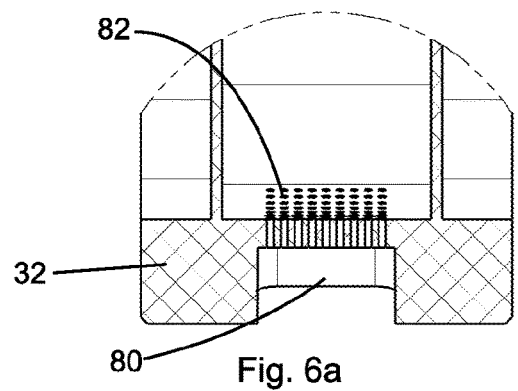
FIG. 6a is an enlarged view of a sediment port seen in FIG. 6.
Figure 7:
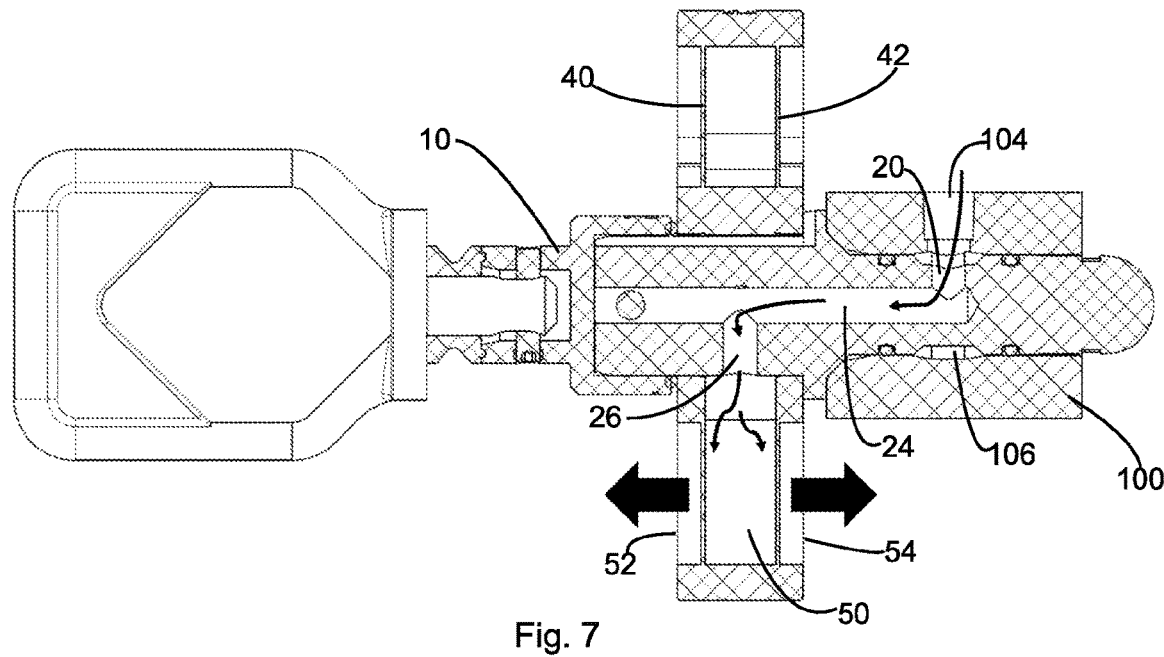
FIG. 7 is a cross section through the subsea filter of FIG. 1 shown during outward fluid flow.
Figure 8:
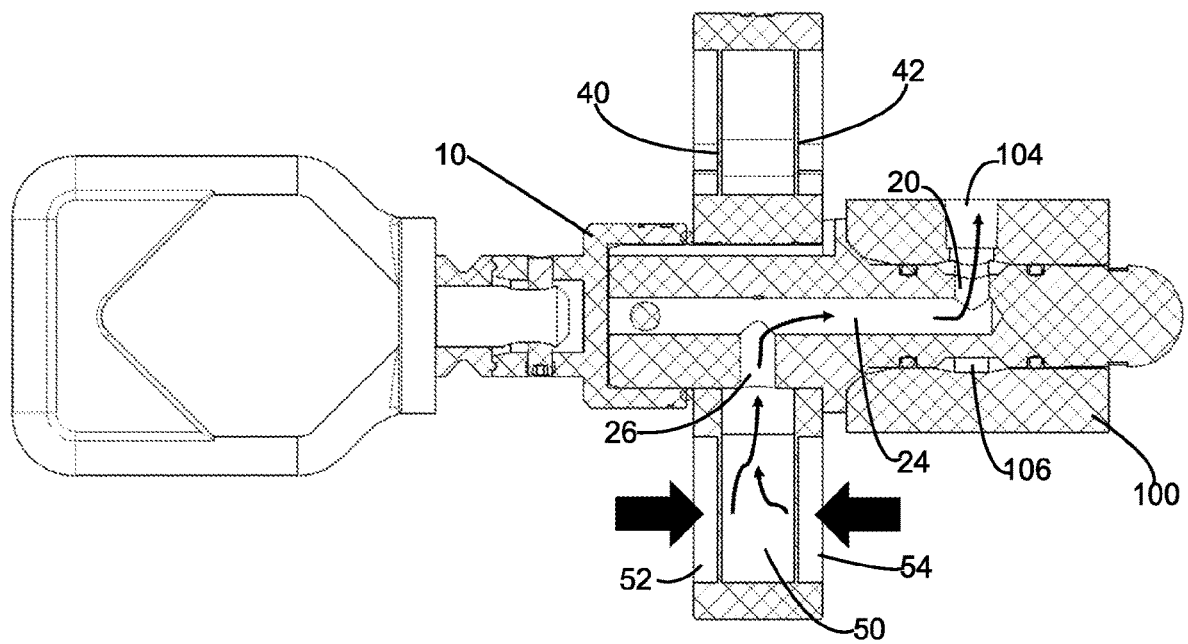
FIG. 8 is a cross section through the subsea filter of FIG. 1 shown during inward fluid flow.
Figure 9:
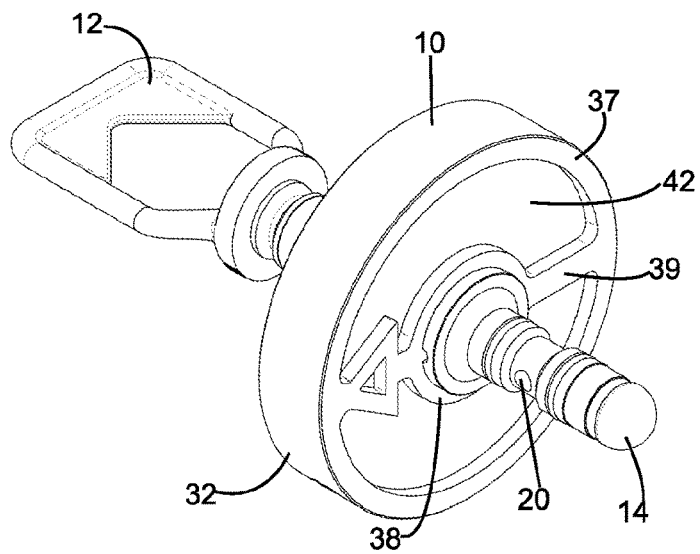
FIG. 9 is an inner perspective of the subsea filter of FIG. 1.
Figure 10:
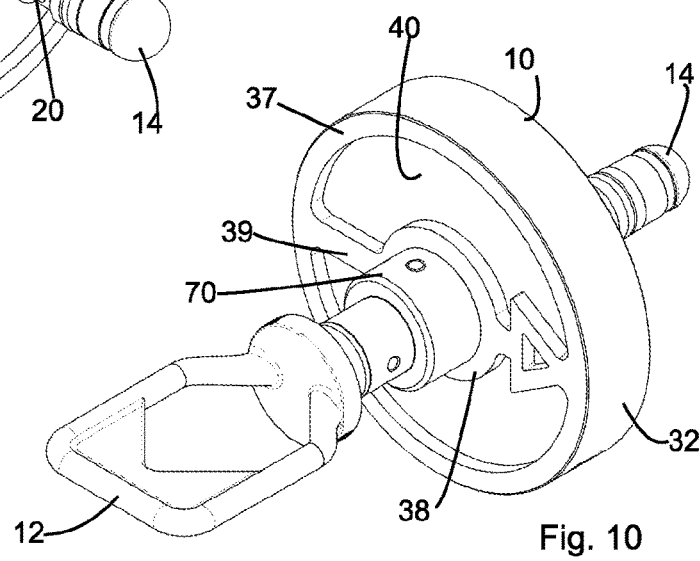
FIG. 10 is an outer perspective of the subsea filter of FIG. 1.
Figure 11:
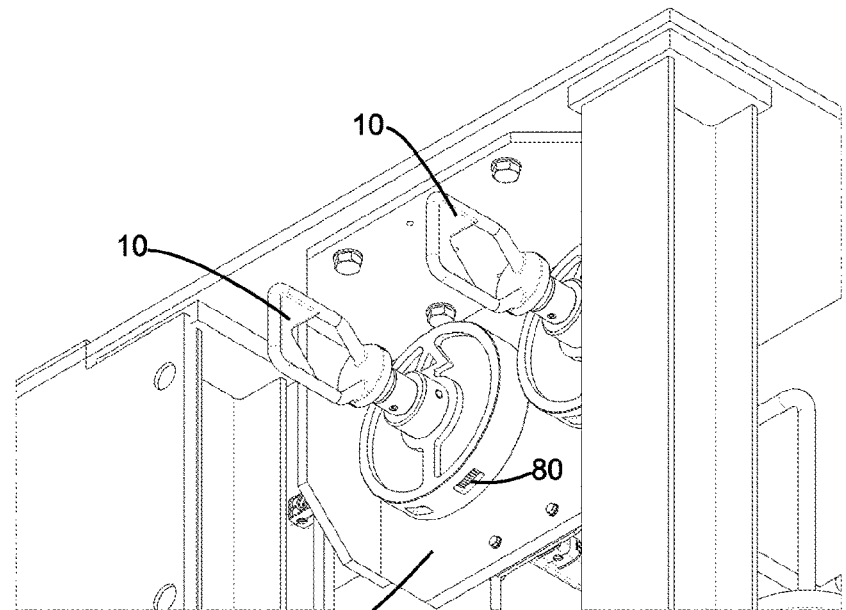
FIG. 11 is an outer perspective of two of the subsea filters of FIG. 1, shown in use.

In use, the subsea filter 10 can be manipulated by an ROV or a diver into a position whereby the connecting plug 14 is horizontal, and the filtration screens 40, 42 are vertical. The connecting plug 14 can then be located within the connecting plug receiving portion 102 of the receptacle 100 of the subsea reservoir or sea chest as shown in FIGS. 4 and 5. When correctly positioned, the first flow port 20 of the filter 10 will axially align with the fluid port 104 of the receptacle 100 as shown in FIGS. 5, 7 and 8, creating an annular void 106 fluidly connected to both the first flow port 20 and the fluid port 104. The O-rings 22 will seal within the connecting plug receiving portion 102 on both axial sides of fluid port 104.

The flow of fluid away from the reservoir or sea chest is shown in FIG. 7. Water flows from the reservoir or sea chest of the hydraulic actuator via the receptacle 100 through the fluid port 104 and the annular void 106 into the first flow port 20 of the filter 10, along the axial bore 24, through the second flow port 26 and into the annular cylindrical chamber 50. From there it can flow out of the first and second openings 52, 54 into the surrounding seawater.

The flow of water into the reservoir or sea chest is shown in FIG. 8, and is the reverse of the process of FIG. 7. Water is drawn through the first and second openings 52, 54 and the first and second filtration screens 40, 42 into the annular cylindrical chamber 50. The water then flows through the second flow port 26, along the axial bore 24, through the first flow port 20 and into the annular void 106, and then through the fluid port 104 into the receptacle 100 of the reservoir or sea chest.

It will be appreciated that the vertical orientation of the screens 40, 42 minimises the propensity to blockage.

In order to further increase the useful life of the filter 10, the cylindrical outer wall 32 includes a sediment release port 80, positioned to be at a lowest point of the filter 10 during use. The sediment release port 80 includes perforations 82 which allow sediment which settles at the base of the cylindrical chamber 50 to fall through to the surrounding seawater.

Nonetheless, it is understood that in time the filter 10 will become blocked. In this situation, it can be readily removed and replaced by an ROV in the same manner as its installation.

It will be appreciated that the axial bore 24 represents an axial portion of a flow path for water through the filter 10.

In an alternative embodiment, the filter 10 may have a plurality of axially aligned bores 24, each parallel to each other but separate within the connecting plug 14. In such an embodiment, each of the bores 24 may be associated with a distinct first flow port 20. A plurality of such first flow ports 20 may be axially spaced along the distal end 16 of the connecting plug 14, each associated with a different fluid port 104 of the receptacle 100.

Each of the bores 24 may be associated with a distinct second flow port 26. A plurality of such second flow ports 26 may be axially spaced along the proximal end 18 of the connecting plug 14, each having a respective annular cylindrical chamber 50 with associated first and second screens 40, 42.

Modifications and variations as would be apparent to a skilled addressee are deemed to be within the scope of the present invention.

What is claimed is:

1. A subsea filter having an elongate connecting plug extending along an operating axis; and at least one filtration screen;
    the elongate connecting plug having a fluid flow path defined between a first flow port and a second flow port, the first flow port and the second flow port being axially spaced along the elongate plug; and
    the filtration screen being located outside the second flow port in order to filter seawater entering the fluid flow path by the second flow port, wherein the subsea filter has at least one opening through which seawater can pass, the filtration screen being located between the at least one opening and the second flow port.

2. A subsea filter as claimed in claim 1, wherein the connecting plug is a hot-stab style plug.

3. A subsea filter as claimed in claim 1, wherein the filtration screen extends away from the elongate connecting plug.

4. A subsea filter as claimed in claim 3, wherein the filtration screen extends away from the elongate connecting plug in a generally radial direction.

5. A subsea filter as claimed in claim 3, wherein the filtration screen is perpendicular to the operating axis.

6. A subsea filter as claimed in claim 5, wherein the filtration screen is annular, and centred about the operating axis.

7. A subsea filter as claimed in claim 6, wherein the subsea filter includes two annular openings, each of which has an associated filtration screen, the annular openings being axially spaced from each other.

8. A subsea filter as claimed in claim 7, wherein the subsea filter includes an outer cylindrical casing around the filtration screens; the outer cylindrical casing combining with the screens and a portion of the elongate connecting plug to form an annular cylinder, the second flow port being located on the portion of the elongate connecting plug.

9. A subsea filter as claimed in claim 1, wherein the first flow port is axially spaced from the second flow port.

10. A subsea filter as claimed in claim 9, wherein the first flow port is located distally of the second flow port.

11. A subsea filter as claimed in claim 1, wherein the first flow port is oriented in a radial direction.

12. A subsea filter as claimed in claim 1, wherein the second flow is oriented in a radial direction.

13. A subsea filter as claimed in claim 1, wherein the elongate connecting plug has a plurality of fluid flow paths, the fluid flow paths having respective axial portions which are parallel to each other.

14. A subsea filter as claimed in claim 13, wherein each fluid flow path has a corresponding first flow port and second flow port, the respective first flow ports being axially spaced along the elongate connecting plug.

15. A subsea filter having an elongate connecting plug extending along an operating axis; and at least one filtration screen extending away from the elongate connecting plug;
    the elongate connecting plug having a fluid flow path defined between a first flow port oriented towards a distal end of the elongate connecting plug and a second flow port oriented towards a proximal end of the elongate connecting plug;
    the subsea filter having at least one opening through which seawater can pass; and
    the filtration screen being located between the at least one opening and the second flow port.

16. A subsea filter having an elongate connecting plug extending along an operating axis; and at least one filtration screen;
    the elongate connecting plug having a fluid flow path defined between a first flow port and a second flow port, the first flow port and the second flow port being axially spaced along the elongate plug; and
    the filtration screen being located outside the second flow port in order to filter seawater entering the fluid flow path by the second flow port, wherein the filtration screen extends away from the elongate connecting plug in a generally radial direction.

17. A subsea filter having an elongate connecting plug extending along an operating axis; and at least one filtration screen;
    the elongate connecting plug having a fluid flow path defined between a first flow port and a second flow port, the first flow port and the second flow port being axially spaced along the elongate plug; and
    the filtration screen being located outside the second flow port in order to filter seawater entering the fluid flow path by the second flow port,
    wherein the filtration screen extends away from the elongate connecting plug, the filtration screen being annular, and centred about the operating axis;
    and wherein the subsea filter includes two annular openings, each of which has an associated filtration screen, the annular openings being axially spaced from each other.

18. A subsea filter as claimed in claim 17, wherein the subsea filter includes an outer cylindrical casing around the filtration screens; the outer cylindrical casing combining with the screens and a portion of the elongate connecting plug to form an annular cylinder, the second flow port being located on the portion of the elongate connecting plug.

* * * * *